United States Patent [19]
Serizawa

[11] Patent Number: 5,820,054
[45] Date of Patent: Oct. 13, 1998

[54] FILM CARRIER

[75] Inventor: Mitsuhiko Serizawa, Kanagawa, Japan

[73] Assignee: Fuji Photo Film Co., Ltd., Kanagawa, Japan

[21] Appl. No.: 889,182

[22] Filed: Jul. 7, 1997

Related U.S. Application Data

[62] Division of Ser. No. 458,559, Jun. 2, 1995, Pat. No. 5,683,052.

[30] Foreign Application Priority Data

| Jun. 13, 1994 | [JP] | Japan | 6-130173 |
| Jun. 16, 1994 | [JP] | Japan | 6-134212 |

[51] Int. Cl.⁶ .............. B65H 18/08; G03B 1/32; G03B 1/58
[52] U.S. Cl. ............ 242/332.7; 242/348.1
[58] Field of Search ............ 242/332.7, 348.1, 242/348.4, 356.5, 356.6, 358.1, 415.1, 532, 545.1, 579; 355/27, 40

[56] References Cited

U.S. PATENT DOCUMENTS

| 2,144,622 | 1/1939 | Frost | 242/341 |
|---|---|---|---|
| 2,983,462 | 5/1961 | Berlings | 242/341 |
| 3,039,710 | 6/1962 | Walter | 242/535.1 |
| 3,450,365 | 6/1969 | Kaplan | 242/415.1 |
| 3,493,193 | 2/1970 | Cpandacc et al. | 242/356.6 |
| 3,645,434 | 2/1972 | Rab | 242/348.4 |
| 3,659,806 | 5/1972 | Crafts | 242/356.6 |
| 3,788,572 | 1/1974 | Wrobleewski | 242/332.7 |
| 3,852,787 | 12/1974 | Nims et al. | 242/358.1 |
| 4,166,588 | 9/1979 | Krehbiel et al. | 242/348.1 |
| 4,285,480 | 8/1981 | Parker | 242/332.7 |
| 4,477,162 | 10/1984 | Matsumoto | 242/332.7 |
| 4,609,163 | 9/1986 | Kimura et al. | 242/332.7 |
| 4,974,787 | 12/1990 | Arai et al. | 242/332.7 |
| 5,064,137 | 11/1991 | Komatsu | 242/356.5 |
| 5,319,406 | 6/1994 | Takatori | 242/348.4 |
| 5,395,068 | 3/1995 | Kostudis et al. | 242/348.1 |
| 5,465,134 | 11/1995 | Palmer et al. | 242/348 |
| 5,473,402 | 12/1995 | Long et al. | 355/40 |

*Primary Examiner*—John M. Jillions
*Attorney, Agent, or Firm*—Sughrue, Mion, Zinn, Macpeak & Seas, PLLC

[57] ABSTRACT

A film carrier including a cartridge in a cartridge loading section, wherein a photographic film is wound around a cartridge winding shaft; a base section for processing the photographic film at a predetermined printing position on the photographic film; a transporting mechanism for transporting the photographic film on the base section after the photographic film has been pulled from the spool shaft; and a film accommodating section provided downstream from the base section, with respect to the cartridge loading section, wherein the photographic film is accommodated. A driving-force transmitting mechanism is rotated by a driving mechanism, which includes a rotating shaft provided to be rotatable relative to a spool shaft provided in the film accommodating section for winding the photographic film. When at least a predetermined rotating force is applied to the spool shaft in a direction opposite to a direction in which the photographic film is wound around the spool shaft, the spool shaft rotates relative to the rotating shaft in the direction opposite to the direction in which the photographic film is wound around the spool shaft. When the rotating shaft passes through an axial center of the spool shaft and the urging mechanism rotates together with the rotating shaft in the same direction, the urging mechanism urges and presses a block member provided on the rotating shaft in a state in which the block member can move in an axial direction of the rotating shaft.

1 Claim, 11 Drawing Sheets

FILM CARRIER

This is a divisional of application Ser. No. 08/458,559 filed Jun. 2, 1995 now U.S. Pat. No. 5,683,052.

BACKGROUND OF THE INVENTION

1. Field of the Invention

The present invention relates to a film carrier which is provided in a photographic printer or the like and which pulls photographic film out of a cartridge to effect an image-printing operation.

2. Description of the Related Art

An exposed photographic film (for example, a negative film) is brought to a photo processing laboratory for development in a state of being retracted into a case such as a cartridge. In the photo processing laboratory, a negative film retracted into the cartridge is pulled out thereof and is subjected to development processing. Subsequently, the developed negative film is cut in several pieces each having a predetermined number of image frames (for example, six frames), and these pieces are contained in a negative film sleeve and then returned to a customer.

In order to print an image recorded on the negative pieces to obtain a photographic print, an image frame of the negative piece mounted on a film carrier to be positioned at a predetermined position, and light radiated from a light source is transmitted through the image frame of the negative to be exposed on a printing paper. In this way, the image of the negative is printed onto a printing paper or the like.

In recent years, there has been discussed a method in which a developed negative film is retracted into a cartridge without being cut and is returned to a customer. If the negative film is not cut into separate pieces, it is possible to record, on the negative film, information at the time of photographing, information at the time of printing, or the like, and it is also possible to read out information recorded on the negative film and employ the same in a subsequent process such as printing.

The negative film tends to curl when accommodated in the cartridge. For this reason, when a reprint operation is effected in a state in which the negative film is loaded in the film carrier, the negative film pulled out of the cartridge may entwine due to its curling and be damaged. Further, when the negative film is retracted again into the cartridge after a printing operation is finished, the negative film may not be smoothly retracted, thereby causing the negative film to bend.

Accordingly, there has been proposed a film carrier having a film accommodating portion for accommodating a negative film pulled out of a cartridge in a state in which the negative film is wound around a winding shaft. In this type of film carrier, the negative film pulled out of the cartridge is trained around the winding shaft provided in the film accommodating portion and is wound up in a layered state with the winding shaft being rotated by a motor or the like. This prevents the negative film from entwining due to its curling.

However, in the above-described film carrier, transporting and stopping the negative film is repeatedly effected for a printing operation. For this reason, the conveying speed of the negative film transported to the film accommodating portion is not constant, the diameter of the winding shaft with the roll of negative film being wound thereon varies as the negative film is wound around the winding shaft, and therefore, the peripheral velocity of the winding shaft (i.e., the speed of winding the negative film at an outer periphery of the wound roll of the negative film) also varies. As a result, it is difficult to control a motor to synchronize the film winding speed and the film conveying speed. If the film winding speed of the winding shaft is not synchronized with the film conveying speed, a slack portion and a tight portion are alternately formed on the wound negative film. Accordingly, surfaces of the negative film in a state of being wound around the winding shaft rub against each other and are damaged.

Further, when the peripheral velocity of the winding shaft winding the negative film is higher than the negative film-conveying speed, the negative film being transported is tightened and conveying accuracy of the negative film deteriorates. In addition, an image frame cannot be correctly positioned at a predetermined position.

In view of the above-described circumstances, it is a first object of the present invention to provide a film carrier which, using a simple structure, uniformly winds a photographic film without damaging surfaces of the photographic film and deteriorating conveying accuracy of the photographic film, and enables a smooth exposure operation.

It is a second object of the present invention to provide a film carrier which does not require control of a complicated winding mechanism for preventing occurrence of unnecessary tension and slack on a photographic film pulled out of a cartridge and which enables a smooth exposure operation.

SUMMARY OF THE INVENTION

In accordance with the first aspect of the present invention, there is provided a film carrier in which a cartridge, where a photographic film is wound around a winding shaft in a layered state and is accommodated, is loaded in a cartridge loading portion, the photographic film is transported on a base portion by transporting means while being pulled out of the cartridge, and image frames recorded on the photographic film are successively disposed at a predetermined printing position, and at the same time, the photographic film is retracted and accommodated in a film accommodating portion provided on a side opposite to the cartridge loading portion with the base portion disposed between the film accommodating portion and the cartridge loading portion, comprising: a spool shaft provided in said film accommodating portion for winding the photographic film; guiding means provided in the film accommodating portion for guiding the photographic film transported by the transporting means toward a periphery of said spool shaft and for winding said photographic film around the spool shaft; driving means which can drive the spool shaft to rotate; and driving-force transmitting means provided between the driving means and the spool shaft for transmitting driving force of the driving means to the spool shaft such that a winding speed of the spool shaft is adjusted to a conveying speed of the transporting means.

In the first aspect of the film carrier, the photographic film pulled out of the cartridge is trained around the spool shaft by the guiding means of the film accommodating portion. When the spool shaft is rotated by the driving means, the photographic film is wound around the spool shaft. Further, when the spool shaft is rotated in the direction opposite to that in which the photographic film is wound therearound, the photographic film wound around the spool shaft is pulled out of the film accommodating portion and is wound back to the cartridge.

When the spool shaft winds up the photographic film, driving force of the driving means is transmitted to the spool shaft by the driving-force transmitting means. The driving-force transmitting means can transmit the driving force from the driving means to the spool shaft such that tension of the photographic film trained around the spool shaft becomes constant, and can enable the spool shaft to wind up the photographic film with no slack being formed in the photographic film.

In accordance with the second aspect of the present invention, there is provided a film carrier in which said driving-force transmitting means is rotated by the driving means, further comprising a rotating shaft provided to be rotatable relatively with respect to said spool shaft, and urging means for transmitting rotating force between the spool shaft and the rotating shaft by a predetermined frictional force generated between the rotating shaft and the spool shaft.

In the second aspect of the film carrier, the frictional force is generated between the rotating shaft and the spool shaft by the urging means. When a predetermined tension or more is formed in the photographic film trained around the spool shaft due to the difference between the peripheral velocity of the spool shaft and the conveying speed of the photographic film, the frictional force decreases against the urging force of the urging means. At the same time, the rotating speed of the spool shaft decreases. Further, when the tension of the photographic film becomes lower than the predetermined tension, the frictional force increases by the urging force of the urging means, and the spool shaft follows and rotates together with the rotating shaft.

As a result, formation of tight and slack portions in the photographic film is prevented and the photographic film is wound around the spool shaft.

In accordance with the third aspect of the present invention, there is provided a film carrier in which when at least a predetermined rotating force is applied to the spool shaft in a direction opposite to a direction in which the photographic film is wound around the spool shaft, the spool shaft can rotate relatively with respect to the rotating shaft in the direction opposite to the direction in which the photographic film is wound around the spool shaft.

In the third aspect of the film carrier, when tension greater than the frictional force generated between the spool shaft and the rotating shaft by the urging force of the urging means acts on the photographic film, the spool shaft rotates relatively with respect to the rotating shaft against the frictional force in the direction opposite to that in which the photographic film is wound around the spool shaft (i.e., the direction in which the photographic film is pulled out thereof). As a result, the photographic film is uniformly wound around the spool shaft with no slack being formed in the wound photographic film.

Further, when the photographic film wound around the spool shaft is wound back to the cartridge, the spool shaft is easily rotated by the photographic film in the direction in which the photographic film is pulled out of the spool shaft.

As the driving-force transmitting means, for example, a simple structure can be used, in which the coil spring is spanned between the boss integrally formed with the rotating shaft and the boss integrally formed with the spool shaft, a predetermined frictional force is generated between the respective bosses and the coil spring by tightly pressing the respective bosses by the urging force of the coil spring, so as-to cause the rotating shaft and the spool shaft to integrally rotate with each other. In this case, the coil spring is disposed so as to be coaxial with the rotating shaft, spool shaft, and respective bosses.

If the direction in which the coil spring is wound when seen from the side of the spool shaft is opposite to the direction in which the photographic film is wound around the spool shaft, when the spool shaft is subjected to a predetermined force or more in the direction opposite to that in which the photographic film is wound therearound, i.e., force greater than or equal to the urging force of the coil spring, by tension of the photographic film, slack is formed in the coil spring and the frictional force between the coil spring and the bosses is reduced. Therefore, the spool shaft is rotated relatively with respect to the rotating shaft in the direction in which the photographic film is pulled out of the spool shaft irrespective of driving of the driving means.

In accordance with the fourth aspect of the present invention, there is provided the film carrier in which a cartridge, where a photographic film is wound around a winding shaft in a layered state and is accommodated, is loaded in a cartridge loading portion, the photographic film is transported on a base portion by transporting means while being pulled out of the cartridge, and a printing operation is effected in a state in which image frames recorded on the photographic film are successively disposed at a predetermined printing position, comprising: a film accommodating portion which is provided so as to correspond to the cartridge loading portion and in which the photographic film transported on the base portion is retracted; and guiding and holding means for guiding a leading end portion of the photographic film transported and retracted from said base portion in the form of a loop having a predetermined radius in accordance with curling of the photographic film within the cartridge, causing the leading end portion of the photographic film to be led into a new-retracted intermediate portion of the photographic film along the direction in which the photographic film is transported, and at the same time, holding the photographic film guided in the form of a loop without moving the photographic film in a transverse direction thereof.

In the fourth aspect of the film carrier, the photographic film transported on the base portion and pulled into the film accommodating portion is guided in the form of a loop by the guiding and holding means in a state in which the leading end portion thereof moves in accordance with curling of the photographic film. The guided photographic film is led into the new-retracted intermediate portion of the photographic film in a layered state and is held by the guiding and holding means. Further, when the photographic film accommodated in the film accommodating portion is wound back to the cartridge, the outermost layer of the outer periphery of the roll of the photographic film is first pulled out of the film accommodating portion.

As described above, when the leading end portion of the photographic film is first guided in the form of a loop and is led into the new-retracted portion, the winding shaft for winding the retracted photographic film and the driving means for driving the winding shaft to rotate are not needed. Further, it is also unnecessary to correctly control the winding speed of the winding shaft in accordance with the conveying speed of the retracted photographic film. As a result, the photographic film can smoothly be accommodated in and pulled out of the film accommodating portion by the simple structure.

Meanwhile, it is preferable that, when the photographic film is guided in the form of a loop, the photographic film curves gently compared with the curling generated in the photographic film so as to reduce the frictional force between the guiding and holding means and the photographic film.

In accordance with the fifth aspect of the present invention, there is provided a film carrier in which an inner periphery of the guiding and holding means contacting a surface of the photographic film is formed such that frictional resistance between the photographic film and the inner periphery is reduced.

In the fifth aspect of the film carrier, the inner periphery of the guiding and holding means is subjected to a mat finish process and Teflon coating. Accordingly, when the guiding and holding means guides the photographic film in the form of a loop along the inner periphery, frictional resistance between the inner periphery and the surface of the photographic film is reduced, so that the surface of the photographic film contacting the inner periphery at the time of being guided by the guiding and holding means is not damaged.

In accordance with the sixth aspect of the present invention, there is provided a film carrier in which the guiding and holding means may be formed such that rotating members such as rollers, respectively contacting the transported photographic film and rotating freely, are disposed so as to be rotatably supported by a loop-shaped frames or the like.

The film carrier formed in the above-described manner makes it possible to retract and accommodate the photographic film pulled out of the cartridge.

DESCRIPTION OF THE PREFERRED EMBODIMENTS

Figure 1:
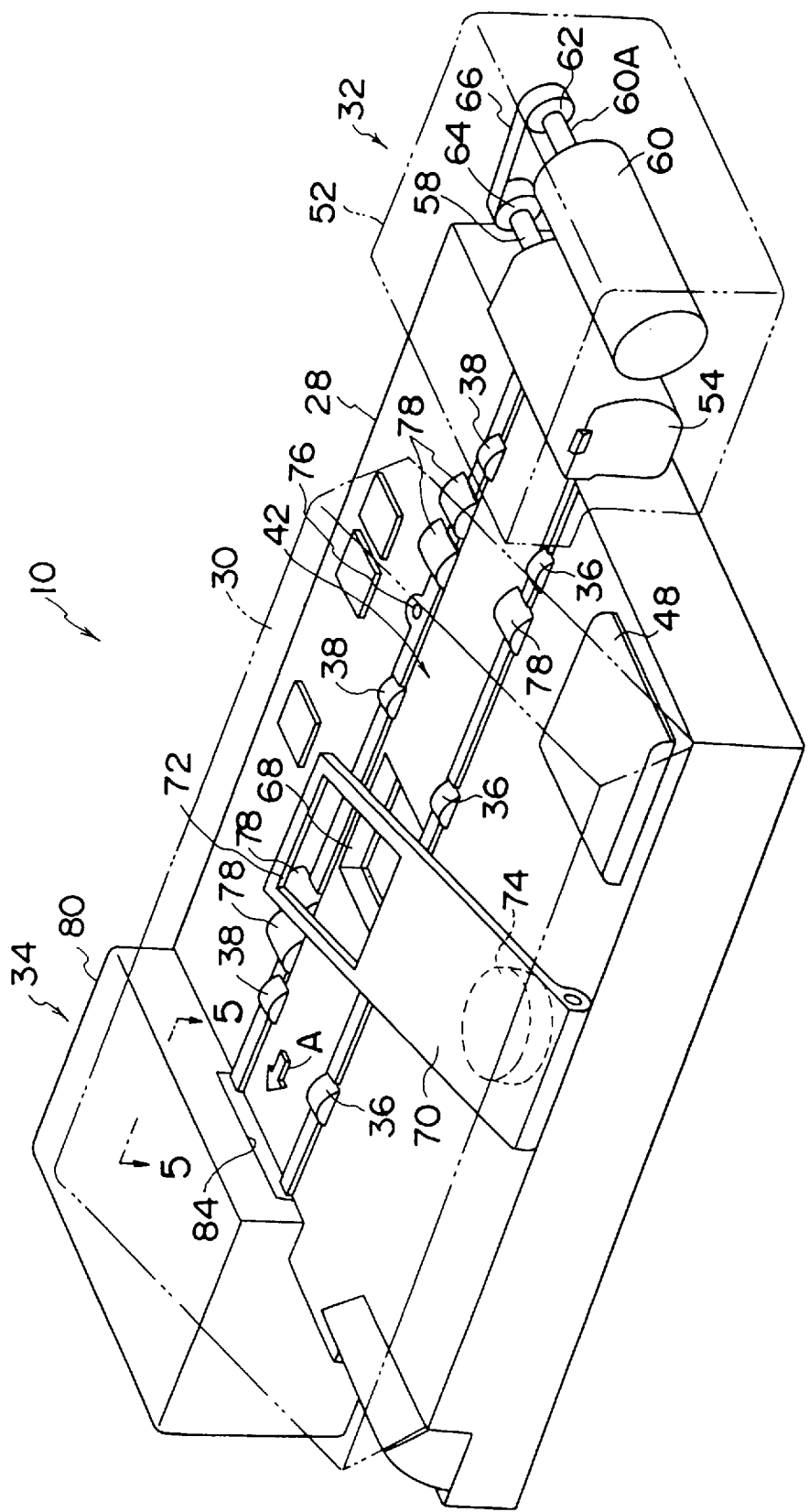
FIG. 1 is a perspective view showing a negative carrier suitable for a first embodiment of the present invention.
Figure 2:
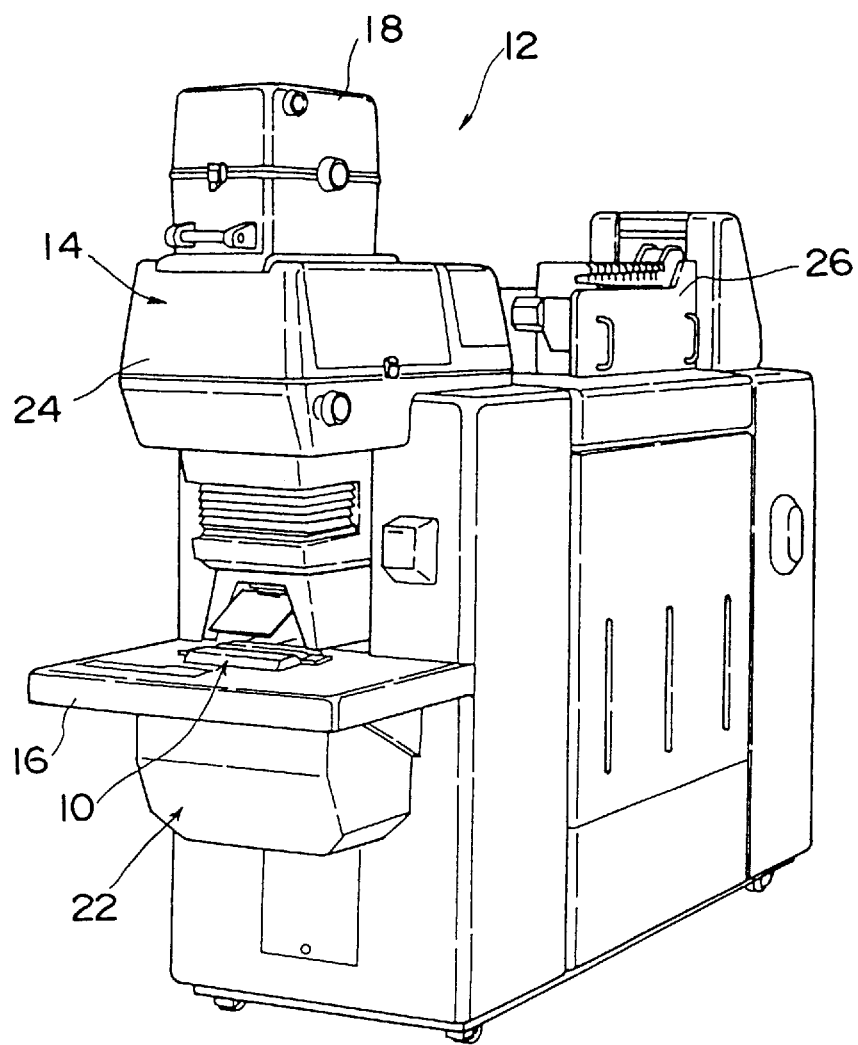
FIG. 2 is a perspective view showing an exterior of a printer processor in which the negative carrier of the first embodiment is mounted.

FIG. 1 shows a negative carrier 10 which is a film carrier according to the present invention. FIG. 2 shows an exterior of a printer processor 12 where the negative carrier 10 is provided. As shown in FIG. 2, a casing 14 of the printer processor 12 is provided with a working table 16 projecting in a horizontal direction. The negative carrier 10 is disposed on the working table 16.

Figure 3:
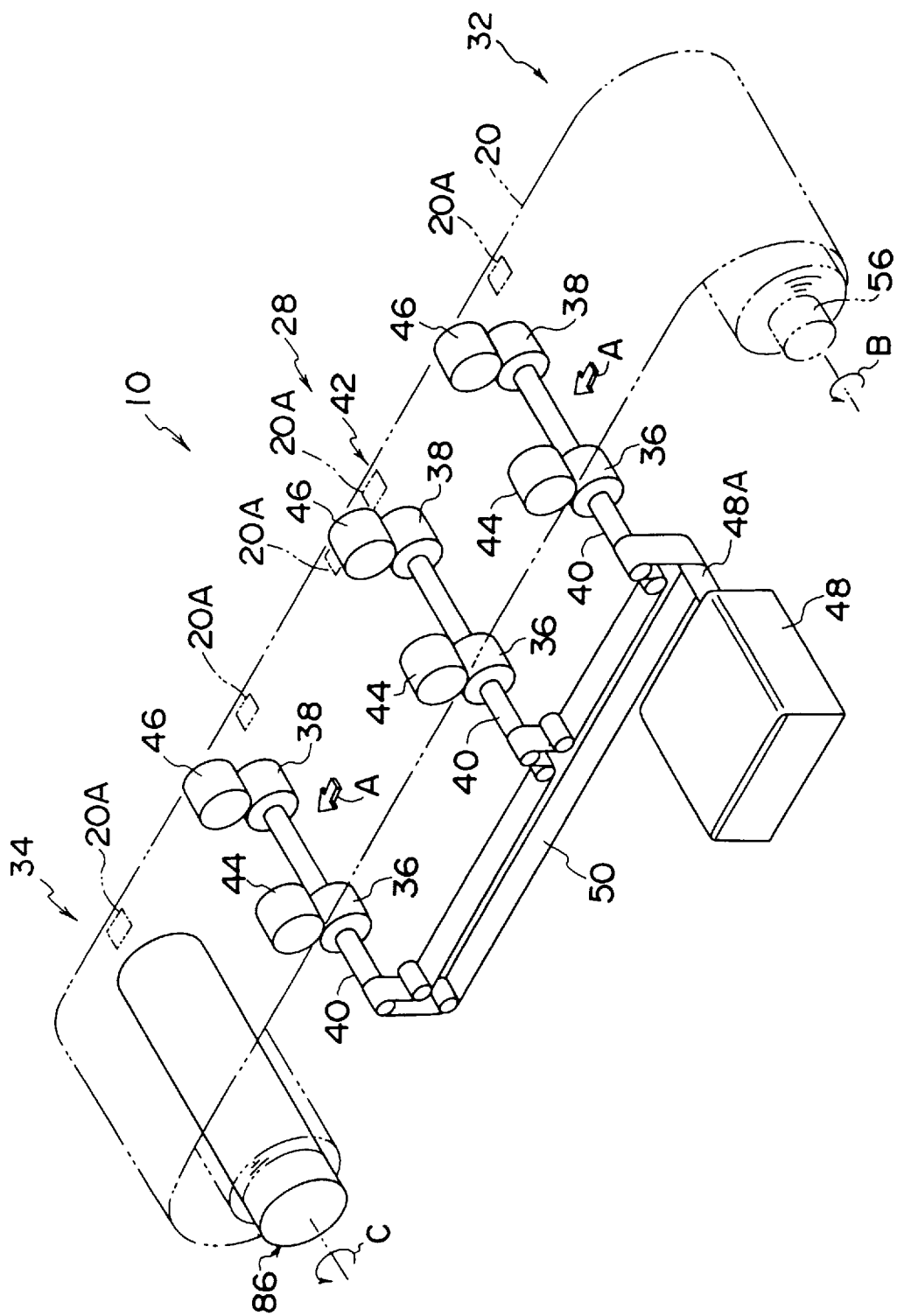
FIG. 3 is a schematic perspective view showing a structure of conveying means of the negative carrier.

In the printer processor 12, an image frame of a developed photographic film (which is hereinafter referred to as "negative film 20" which is shown in FIG. 3) is located at a predetermined position of the negative carrier 10, and light radiated from a light source portion 22 under the working table 16 and transmitting through the negative film 20 in the negative carrier 10 is imaged on a printing paper pulled out of a paper magazine 18 at a predetermined position of a printing portion 24 within the casing 14. In this way, an image is printed. The printing paper after printing an image is finished is transported within the casing 14, where the printing paper is subjected to a series of processes of color development, bleaching/fixing, washing and drying. Subsequently, the printing paper is cut at every printed image frame and discharged, as photographic prints, to a sorter 26 or the like.

In FIG. 1, the negative carrier 10 of an embodiment of the present invention is shown. The negative carrier 10 includes a base 28, an opening/closing cover 30 for covering an upper portion of the base 28, a cartridge loading portion 32 and a film accommodating portion 34, these latter two portions being respectively disposed at both sides of the base 28. Further, the base 28 is provided with a plurality of pairs of conveying rollers 36, 38, which form a conveying path of the negative film 20 between the cartridge loading portion 32 and the film accommodating portion 34.

As shown in FIG. 3, each of the pairs of conveying rollers 36, 38 are connected with each other by a shaft 40 in such a manner as to be opposed to transverse-directional end portions of the transported negative film 20. At the same time, a portion of an outer peripheral portion of each of the pairs of conveying rollers 36, 38 appears above the base 28 (see FIG. 1). Thus, the conveying path 42 of the negative film 20 is formed between the cartridge loading portion 32 and the film accommodating portion 34.

As shown in FIG. 1, the opening/closing cover 30 can rotate around an end portion thereof on this side of the paper of FIG. 1 in directions in which the opening/closing cover 30 opens and closes by an unillustrated hinge. When the opening/closing cover 30 rotates in a closing direction, the cover 30 is adapted to cover the upper surface of the base 28. Further, the opening/closing cover 30 is provided with rollers 44, 46 (see FIG. 3) respectively corresponding to the conveying rollers 36, 38. When the opening/closing cover 30 is closed, both end portions of the negative film 20 in a transverse direction thereof are nipped by the conveying rollers 36, 38 and the idle rollers 44, 46.

A conveying motor 48 is provided on the base 28 of the negative carrier 10. As shown in FIG. 3, an endless belt 50 is trained around a drive shaft 48A of the conveying motor 48 and each shaft 40 of the plurality of pairs of conveying rollers 36, 38, thereby causing driving force of the conveying motor 48 to be transmitted to each of the plurality of pairs of conveying rollers 36, 38. When the driving force of the conveying motor 48 is transmitted to each of the pairs of conveying rollers 36, 38 and idle rollers 44, 46 in a state in which the negative film 20 is nipped between the pairs of conveying rollers 36, 38 and idle rollers 44, 46, the negative film 20 is correctly transported on the base 28 from the cartridge loading portion 32 to the film accommodating portion 34 (i.e., in the direction of arrow A in FIG. 3) and from the film accommodating portion 34 to the cartridge loading portion 32.

As shown in FIG. 1, the cartridge loading portion 32 is equipped with a cartridge 54 in which the negative film 20 is retracted into and accommodated within a housing 52. At this time, a rotating shaft 58 is connected to a winding shaft 56 (see FIG. 3) of the cartridge 54. Further, a motor 60 is provided within the housing 52. An endless timing belt 66 is trained around a pulley 62 provided on a drive shaft 60A of the motor 60 and a pulley 64 provided on the rotating shaft 58.

For this reason, driving force of the motor 60 is transmitted to the winding shaft 56 of the cartridge 54, and the winding shaft 56 is rotated in a direction in which the negative film 20 wound on the winding shaft 56 is pulled out of the cartridge 54 (i.e., the direction indicated by arrow B in FIG. 3) or a direction in which the negative film 20 is retracted in the cartridge 54 (i.e., the direction opposite to arrow B). Further, the timing belt 66 causes rotating force of the motor 60 to be correctly transmitted to the winding shaft 56, so that a predetermined amount of the negative film 20 can be pulled out of the cartridge 54 and retracted therein.

Meanwhile, since the negative film 20 is retracted into the cartridge 54 with an emulsion side of the negative film 20 facing an inner side of the cartridge 54, the emulsion side is adapted to face the upper surface of the base 28 when the negative film 20 is pulled out of the cartridge 54. Further, in order to cause rotation of the winding shaft 56 to be adjusted to the speed at which the negative film 20 is transported by the pairs of conveying rollers 36, 38, a clutch mechanism or the like may be provided between the motor 60 and the winding shaft 56.

As shown in FIG. 1, an opening 68 for printing is formed on the base 28 at a central portion of the conveying path 42. Light from the light source portion 22 of the above-described printer processor 12 is radiated on the opening 68. Further, at a central portion of the opening/closing cover 30, a negative pressing plate 70 is formed in such a state in which one end thereof is rotatably mounted on the opening/closing cover 30 and an opening 72 is adapted to face the opening 68 of the base 28. Further, an electromagnet 74 is provided on the base 28. The electromagnet 74 attracts the negative pressing plate 70 by magnetic force when it is energized.

In a normal state, the negative pressing plate 70 is held by the opening/closing cover 30. When the electromagnet 74 is energized in a state in which the opening/closing cover 30 is closed, the negative pressing plate 70 is attracted to the base 28 and nips the negative film 20 on the conveying path 42 between a peripheral edge of the opening 68 of the base 28 and a peripheral edge of the opening 72 of the negative pressing plate 70.

A light source 76 (for example, an LED) is provided on the base 28 between the opening 68 on the conveying path 42 and the cartridge loading portion 32. The light source 76 is used to detect perforations 20A (see FIG. 3) formed at the end portion of the negative film 20 in the transverse direction thereof. The opening/closing cover 30 is provided with an unillustrated perforation detecting sensor which faces the light source 76 in a state in which the opening/closing cover 30 is closed.

The negative carrier 10 is constructed so that, on the basis of detection of the perforation 20A which corresponds to each image frame of the negative film 20 passing on the conveying path 42, respective positions of image frames recorded on the negative film 20 can be correctly detected. As a result, in the negative carrier 10, the negative film 20 can be transported at a fixed velocity and each image frame thereof can be correctly positioned to correspond to the opening 68, and each image frame of the negative film 20 can be held between the opening 68 and the opening 72 with the negative film 20 being nipped by the negative pressing plate 70.

In this state, when light is radiated from the light source portion 22 of the printer processor 12 to the opening 68, the light transmits through the image frame of the negative film 20 and passes, from the opening 72, through an unillustrated opening formed in the opening/closing cover 30. As a result, an image is formed on a printing paper at the printing portion 24. Thus, in the negative carrier 10, the negative film 2Q is pulled out of the cartridge 54 while being transported at a fixed velocity and being stopped, repeatedly.

The base 28 is provided with a plurality of backup rollers 78 disposed adjacent the conveying rollers 36, 38. The opening/closing cover 30 is provided with an unillustrated magnetic recording head and/or magnetic reading head, corresponding to each of the backup rollers 78. The magnetic recording head and/or magnetic reading head faces a magnetic tape portion (not shown) which is provided at both end portions of the negative film in the transverse direction thereof and which can have magnetic information recorded thereon. When the negative film 20 is transported, the magnetic reading head reads magnetic information recorded on the negative film 20, and if necessary, the magnetic recording head records magnetic information on the negative film 20.

On the other hand, in the film accommodating portion 34 provided on the base 28 on the side opposite to the cartridge loading portion 32, a film accommodating case 82 (see FIG. 5) is disposed within a housing 80. The negative film 20 transported on the base 28 is received in the film accommodating case 34 from an opening 84 formed in the housing 80 on the side of the conveying path 42 of the base 28.

Figure 5:
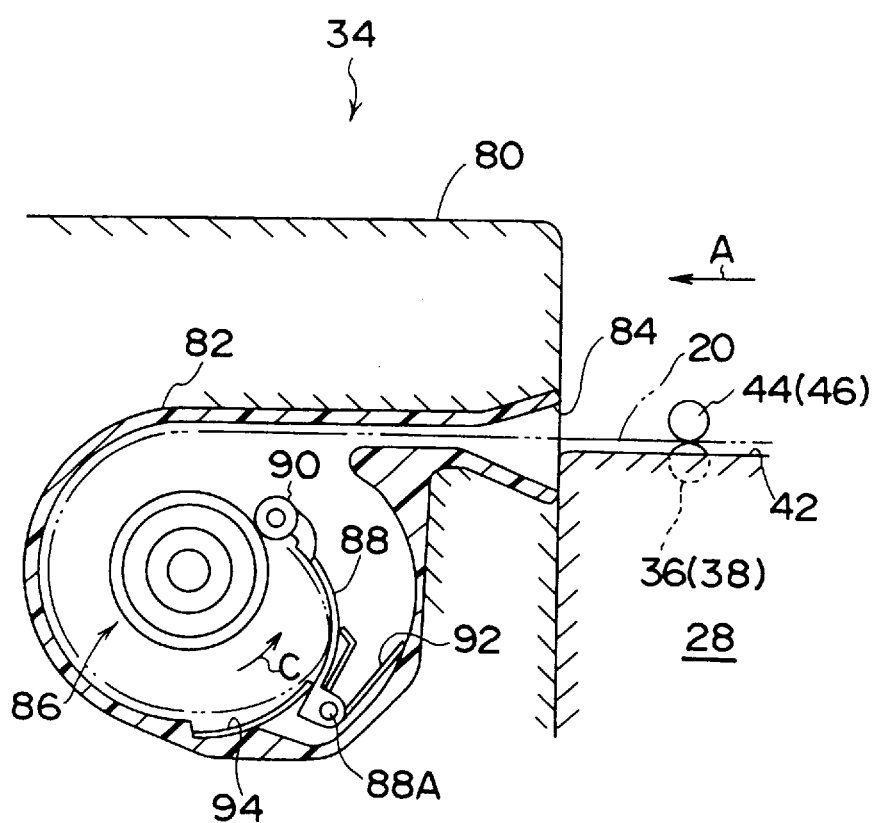
FIG. 5 is a cross-sectional view of a main part of the film accommodating portion taken along the lines 5—5 of FIG. 1.

As shown in FIG. 5, the film accommodating case 82 is constructed in that an inner surface thereof is curved such that a section of the film accommodating case 82 taken along a direction in which the negative film 20 on the base 28 is transported (i.e., the direction of arrow A in FIG. 5) is formed into a substantially cylindrical shape. An outer peripheral portion of the film accommodating case 82 extends toward the opening 84. A spool shaft 86 whose axial direction is disposed along the transverse direction of the negative film 20 (i.e., the direction from an obverse side to a reverse side of the paper of FIG. 5) is disposed at an axial center portion of the film accommodating case 82. As a result, the negative film 2b transported on the base 28 and retracted into the film accommodating case 82 is guided in such a manner that a leading end portion thereof curves around the spool shaft 86 along the inner surface of the film accommodating case 82. At this time, the negative film 20 is transported and retracted thereinto such that an emulsion surface is disposed on an inner side of the curved negative film, and is curved in accordance with curling caused by the negative film 20 being accommodated in the cartridge 54.

Figure 4:
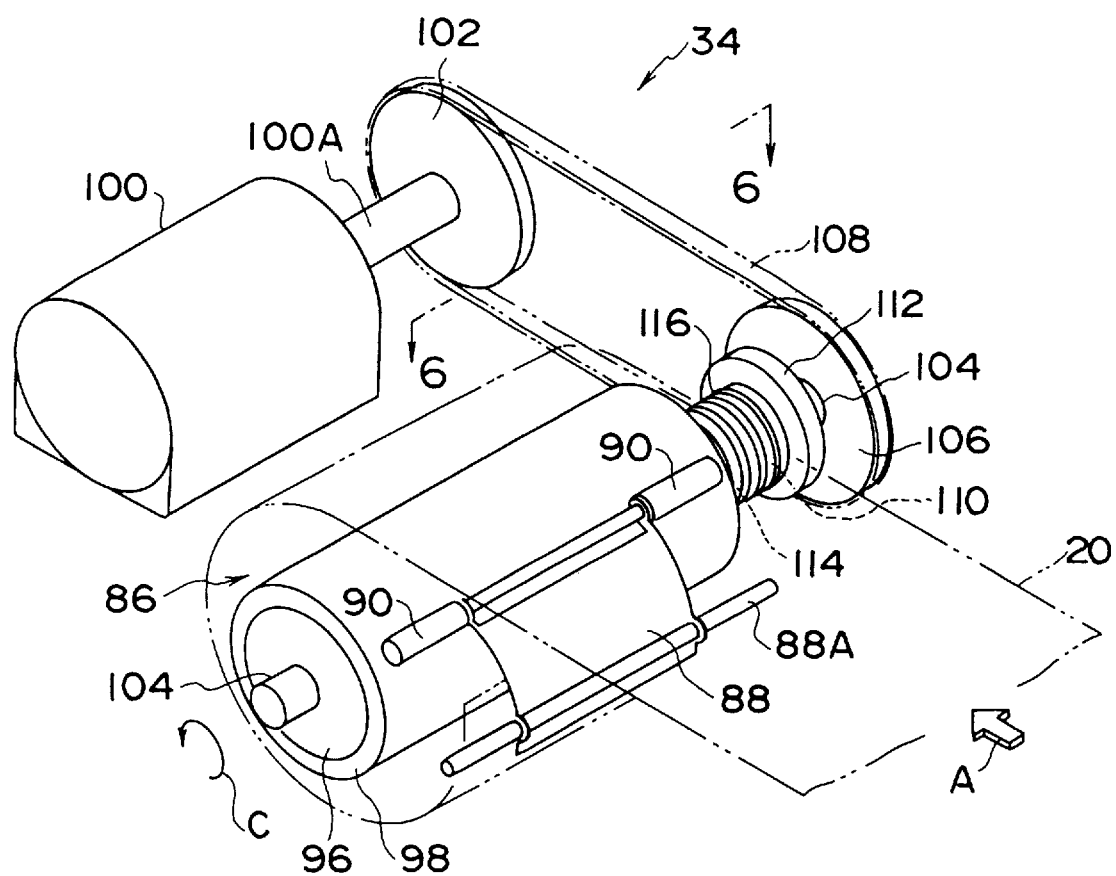
FIG. 4 is a perspective view of a main part of a film accommodating portion, which shows a schematic structure thereof.

As shown in FIGS. 4 and 5, one end of a bracket 88 is rotatably supported by a shaft 88A within the film accommodating case 82 (not shown in FIG. 4) in the vicinity of a lower-side periphery thereof. An intermediate portion of the bracket 88 curves and a leading end portion thereof is directed toward the periphery of the spool shaft 86. Further, a pair of pressing rollers 90 are provided at a leading end of the bracket 88 and the bracket 88 is biased such that the pressing rollers 90 (see FIG. 5) press the periphery of the spool 86 with a predetermined pressure by a helical coil spring 92 provided between the intermediate portion of the bracket 88 and an inner periphery of the film accommodating case 82. In addition, an elastic guide member 94 (see FIG. 5) is disposed between the inner periphery of the film accommodating case 82 and the bracket 88.

As a result, the leading end portion of the negative film 20 transported to and retracted into the film accommodating case 82 is guided from an inner surface of the film accommodating case 82 between the pressing rollers 90 and the periphery of the spool shaft 86 by the elastic guide member 94 and the intermediate portion of the bracket 88.

Figure 6:
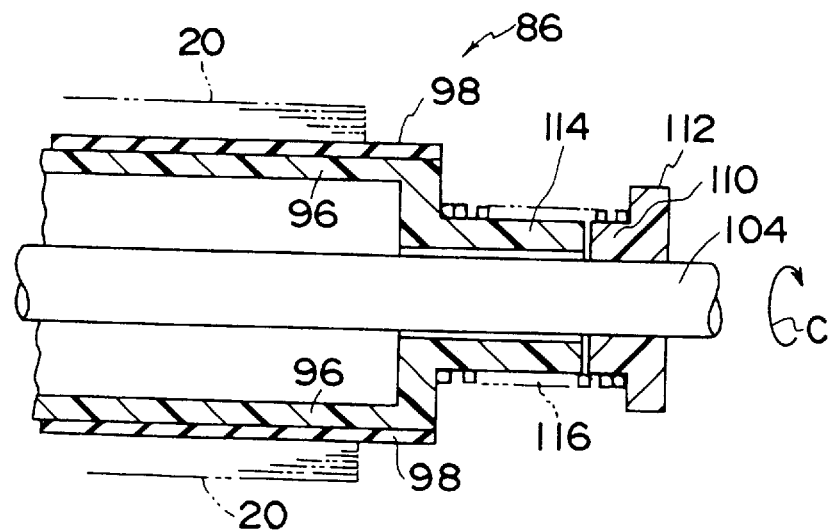
FIG. 6 is a cross-sectional view of a main part of a spool shaft taken along the lines 6—6 of FIG. 4.

As shown in FIG. 6, the spool shaft 86 has a friction member 98 made of a material such as rubber, which generates a predetermined frictional force between an outer peripheral portion of a shaft main body 96 and the negative film 20, formed at the outer peripheral portion of the shaft main body 96. For this reason, the negative film is trained around the spool shaft 86 as the spool shaft 86 rotates in a direction in which the negative film 20 is wound around the spool shaft 86 (i.e., the direction of arrow C in FIGS. 3 and 5) with the negative film being nipped by the periphery of the spool shaft 86 and the pressing rollers 90. It should be noted that the frictional force of the friction member 98 with respect to the negative film 20 and the urging force of the helical coil spring 92 are respectively set at a degree that the negative film 20 can be trained around the spool shaft 86 without being damaged.

As shown in FIG. 4, within the housing 80, there is provided a winding motor 100 which serves as driving means for driving the spool shaft 86. An endless belt 108 is trained around a pulley 102 provided on a driving shaft 100A of the winding motor 100 and a pulley 106 provided on a rotating shaft 104 connected to the spool shaft 86. As a result, the rotating shaft 104 is rotated in the direction in which the negative film 20 is wound around the spool shaft 86 (i.e., the direction of arrow C) or the direction opposite thereto (i.e., the direction in which the negative film 20 is pulled out of the spool shaft 86) by the winding motor 100 being driven.

As shown in FIG. 6, the rotating shaft 104 passes through the center of the shaft main body 96 of the spool shaft 86 and supports the spool shaft 86 such that the spool shaft 86 can rotate relatively with respect to the rotating shaft 104. As for the quality of material of the shaft main body 96 of the spool 86, a plastic material is preferably used which has excellent sliding efficiency and wear resistance with respect to the rotating shaft 104. For example, POM (polyacetal), phenol resin, PPS (polyphenylene sulphide; trade name), PTFE (polytetrafluoroethylene), PC (polycarbonate), and the like can be used.

Further, a flange portion 112 which serves as driving-force transmitting means is provided on the rotating shaft 104 between the spool shaft 86 and the pulley 106 in such a manner as to be coaxial with and integrally rotate with the rotating shaft 104. The flange portion 112 is formed with a boss 110 projecting toward the shaft main body 96 of the spool shaft 86.

A boss 114 whose diameter is substantially the same as that of the boss 110 is provided in the shaft main body 96 of the spool shaft 86 so as to project from the shaft main body 96 toward the flange portion 112. A coil spring 116 serving as urging means is disposed in such a manner as to be spanned across a space between the shaft main body 96 and the flange portion 112. The boss 110 of the flange portion 112 and the boss 114 of the shaft main body 96 are inserted in the coil spring 116 at both ends thereof. The bosses 110, 114 and the coil spring 116 are brought into an engaged state by frictional force which is generated between respective outer peripheries of the bosses 110, 114 and the inner periphery of the coil spring 116 by urging force of the coil spring 116. As a result, the spool shaft 86 and the rotating shaft 104 are coupled to each other.

Further, the coil spring 116 is constructed in that a winding direction thereof when seen from the side of the boss 114 is directed toward the direction opposite to arrow C. The wire material forming the coil spring 116 is formed with a section thereof is in a rectangular shape so as to cause the contact area between the coil spring 116 and the periphery of the boss 114 to become large.

Accordingly, when the rotating shaft 104 is rotated by driving the winding motor 100, the spool shaft 86 is rotated integrally with the rotating shaft 104. It should be noted that the driving speed (number of rotation.) of the winding motor 100 is set such that the spool shaft 86 rotates at peripheral velocity that is faster than the speed in which the negative film 20 on the base 28 is transported by the conveying motor 48.

Meanwhile, when the peripheral velocity of the spool shaft 86 is faster than the conveying speed of the negative film 20, tension acting on the negative film 20 wound around the spool shaft 86 becomes large and force causing the spool shaft 86 to relatively rotate with respect to the rotating shaft 104 in the direction opposite to that in which the negative film 20 is wound around the spool shaft 86 becomes strong. Since the force acts in the direction opposite to that in which the coil spring 116 is wound, a slack portion is formed in the coil spring 116, so that the frictional force between the coil spring 116 and the boss 114 decreases. When the frictional force between the coil spring 116 and the boss 114 decreases, the spool shaft 86 can relatively rotate with respect to the rotating shaft 104 in the direction in which the negative film 20 is pulled out of the spool shaft 86.

Further, when the negative film 20 once pulled out of the cartridge 54 and wound around the spool 86 is pulled back to the cartridge 54, the spool shaft 86 attempts to rotate relatively with respect to the rotating shaft 104 in the direction opposite to arrow C so that the coil spring 116 becomes loose. Further, the frictional force between the coil spring 116 and the boss 110 of the flange portion 112 decreases and the spool shaft 86 can relatively rotate with respect to the rotating shaft 104 in the direction in which the negative film 20 is pulled out of the spool shaft 86 (i.e., the direction opposite to arrow C). At this time, the winding motor 100 may stop operating (i.e., the rotating shaft 104 may stop rotating), and if necessary, the rotating shaft 104 may be driven such that the peripheral velocity thereof is lower than the conveying speed of the negative film 20 in the direction opposite to arrow C.

Next, an operation of the present embodiment will be described.

The negative carrier 10 is disposed on the working table 16 of the printer processor 12. When the image recorded on the developed negative film 20 is printed onto the printing paper, first, the cartridge 54 in which the negative film 20 is accommodated in such a manner as to be wound around the winding shaft 56 in a layered state is loaded in the cartridge loading portion 32. At this time, the rotating shaft 58 is connected to the winding shaft 56 of the cartridge 54 to transmit driving force of the motor 60 to the winding shaft 56.

Subsequently, when an unillustrated start switch of the negative carrier 10 is operated with the opening/closing cover 30 being closed, a printing operation is started by the motor 60, conveying motor 48 and winding motor 100 being driven. When the motor 60 of the cartridge loading portion 32 is driven, the winding shaft 56 of the cartridge 54 rotates in the direction in which the negative film 20 is pulled out of the cartridge 54 (i.e., the direction of arrow B), and the negative film 20 accommodated within the cartridge 54 is transported to the conveying path 42 of the base 28. The negative film 20 pulled out of the cartridge 54 is transported on the base 28 at a fixed velocity in the direction of arrow A in a state of being nipped by the pairs of conveying rollers 36, 38 and the idle rollers 44, 46 which rotate by the driving force of the conveying motor 48.

Thus, in the negative carrier 10, with the negative film 20 being pulled out of the cartridge 54 and being transported on the conveying path 42 of the base 28, the perforation 20A of the negative film 20 is detected by the light source 76 and the perforation detecting sensor provided so as to correspond to the light source 76. The negative film 20 is transported by a fixed amount set in advance on the basis of detection of the perforation 20A, and the image frame of the negative film 20 is disposed between the opening 68 of the base 28 and the opening 72 of the negative pressing plate 70. Subsequently, when the conveying motor 48 and the motor 60 stop operating, the electromagnet 74 is energized and an image frame portion of the negative film 20 is tightly applied to the peripheral edge of the opening 68 and is held thereby.

In this state, when light for printing an image is radiated from the light source portion 22 of the printer processor 10 and is transmitted through the image frame of the negative film 20 held at a predetermined position of the negative carrier 10, an image is formed on a printing paper in the printing portion 24. As a result, the image of the negative film 20 is printed onto the printing paper.

In the printer processor 12, with the conveying motor 48 and the motor 60 of the negative carrier 10 repeatedly operating and stopping, the negative film 20 is pulled out of the cartridge 54. At the same time, the image frames recorded on the negative film 20 are successively disposed at a predetermined printing position and are printed.

At this time, since the negative film 20 is accommodated in the cartridge 54 in a state of being wound around the winding shaft 56, the negative film 20 tends to curl. However, in the negative carrier 10, each plurality of pairs of conveying rollers 36, 38 and backup rollers 44, 46 are disposed along the conveying path 42 on the base 28 and the negative film 20 disposed at the printing position is pressed down on the base 28 by the negative pressing plate 70. For this reason, there is no possibility that distortion or the like occur in the image printed onto the printing paper due to slack caused by curling of the negative film 20, and the image recorded on the negative film 20 is correctly printed onto the printing paper.

On the other hand, the negative film 20 pulled out of the cartridge 54 while being transported at a fixed velocity and stopped, repeatedly, is received in the opening 84 of the film accommodating portion 34 into the film accommodating case 82 within the housing 80.

As shown in FIG. 5, the leading end portion of the negative film 20 received in the film accommodating case 82 is guided from the opening 84 along the inner surface of the film accommodating case 82, and then, guided between the spool shaft 86 and the pressing rollers 90 by the elastic guide member 94 and the bracket 88 and nipped by the periphery of the friction member 98 of the spool shaft 86 and the pressing rollers 90. At this time, the leading end of the negative film 20 is smoothly guided along with the curling tendency of the negative film 20.

In this state, the boss 110 of the flange portion 112 and the boss 114 provided in the shaft main body 96 of the spool shaft 86 are coupled to each other by their frictional force with respect to the coil spring 116. For this reason, the driving force of the winding motor 100 is transmitted to the spool shaft 86 via the rotating shaft 104 and the spool shaft 86 rotates at the peripheral velocity corresponding to the number of rotations of the winding motor 100. When the spool shaft 86 together with the pressing rollers 90 nips the leading end of the negative film 20, the leading end of the negative film 20 is trained around the spool shaft 86. In addition, as the negative film 20 is transported to and received in the film accommodating portion 34, the negative film 20 is wound around the spool shaft 86.

On the base 28, the negative film 20 is transported to the film accommodating portion 34 while being transported at a fixed velocity and stopped, repeatedly. The speed at which the spool shaft 86 winds up the negative film 20 is faster than the above-described fixed velocity. For this reason, tension due to the difference between the above-described fixed velocity and the above-described winding speed of the spool shaft 86 acts on the negative film 20 wound around the spool shaft 86 so as to oppose the spool shaft 86 from rotating in the direction in which the negative film 20 is wound around the spool shaft 86 (i.e., the direction of arrow C).

As a result, the spool shaft 86 attempts to rotate relatively with respect to the rotating shaft 104 in the direction opposite to arrow C and the boss 114 formed in the shaft main body 96 of the spool shaft 86 rotates the coil spring 116 in the direction opposite to arrow C against the urging force of the coil spring 116, so that a slack portion is formed in the coil spring 116. The slack portion formed in the coil spring 116 causes the frictional force between the coil spring 116 and the boss 114 to decrease and the spool shaft 86 rotates relatively with respect to the rotating shaft 104 in the direction opposite to arrow C.

Namely, when a predetermined tension occurs in the negative film 20 wound around the spool shaft 86, the spool shaft 86 is prevented from rotating by the rotating shaft 104 and winds up the negative film 20 while preventing any more tension from acting on the negative film 20. If large tension (greater than the predetermined tension) were to act on the negative film 20 when the spool shaft 86 winds up the negative film 20, the negative film 20 positioned on the conveying path 42 of the base 28 would be strongly tightened. As a result, conveying accuracy deteriorates. Further, if tension greater than the predetermined tension acts on the negative film 20, the negative film 20 is pulled toward the film accommodating portion 34 so that its stopping position is deviated from a predetermined position when the image frame of the negative film 20 is positioned and stopped between the opening 68 of the base 28 and the opening 72 of the negative pressing plate 70.

The negative carrier 10 used in the present embodiment makes it possible to prevent deterioration of conveying accuracy of the negative film 20 on the base 28 and positional deviation of the negative film 20, thereby enabling a smooth and accurate printing operation.

Further, when tension of the negative film 20 wound around the spool shaft 86 is greater than or equal to a predetermined value (in which the frictional force between the boss 114 and the coil spring 116 decreases), a predetermined frictional force acts on between the boss 114 and the coil spring 116, and the spool shaft 86 follows and rotates together with the rotating shaft 104. As a result, there is no possibility that a slack portion be formed in the negative film 20 wound around the spool shaft 86.

Here, if, in a case where the negative film 20 is conveyed on the base 28 at the fixed speed, the spool shaft 86 rotates when a slack portion is formed in the negative film 20 already wound around the spool shaft 86 and the negative film 20 on the base 28 is stopped, not only the slack portion of the negative film 20 already wound around the spool 86 is removed, but also the negative film 20 is tightly pulled. As a result, there is a problem in that surfaces of the negative film 20 already wound around the spool shaft 86 rub against each other and are damaged. However, in the present embodiment, since slack is not formed on the negative film 20 already wound around the spool shaft 86, the surfaces of the negative film 20 cannot rub against each other.

On the other hand, after an operation for printing, onto the printing paper, the image recorded on the negative film 20 pulled out of the cartridge 54 is finished, the negative film 20 wound around the spool shaft 86 and accommodated in the film accommodating portion 34 is transported back to the cartridge 54. In this operation, the conveying motor 48 and the motor 60 are driven in reverse and the negative film 20 is transported on the conveying path 42 of the base 28 toward the cartridge loading portion 32. At this time, in the film accommodating portion 34, the winding motor 100 is adapted to stop, or the spool shaft 86 is adapted to rotate at a peripheral velocity that is lower than the conveying speed of the negative film 20 on the conveying path 42.

At this time, the negative film 20 attempts to rotate the spool shaft 86 in the direction in which the negative film 20 is pulled off of the spool shaft 86 (i.e., the direction opposite to arrow C). Since the rotating speed of the rotating shaft 104 is lower than the speed at which the negative film 20 attempts to rotate the spool shaft 86, the spool shaft 86 attempts to rotate relatively with respect to the rotating shaft 104 in the direction in which the negative film 20 is pulled out thereof, and a slack portion occurs in the coil spring 116, thereby causing the frictional force between the coil spring 116 and the boss 114 formed on the spool shaft 86 to decrease. As a result, the spool shaft 86 rotates relatively with respect to the rotating shaft 104 in the direction in which the negative film 20 is pulled out of the spool shaft 86.

Further, the spool shaft 86 rotates in a state in which the negative film 20 is subjected to a fixed tension by friction generated by the urging force of the coil spring 116. For this reason, the negative film 20 is pulled into the cartridge 54 of the cartridge loading portion 32 with a fixed tension, thereby enabling a smooth winding operation.

Since the driving force of the winding motor 100 for driving the spool shaft 86 in the direction in which the negative film 20 is wound around the spool shaft 86 is transmitted to the spool shaft 86 via the driving-force transmitting means formed by the bosses 110, 114 and the coil spring 116, the film accommodating portion 34 can smoothly retract and accommodate the negative film 20 without forming any slack in the negative film 20. Further, curling of the negative film 20, which is caused by that the negative film 20 is accommodated so as to be wound around the winding shaft 56 of the cartridge 54 in a layered state, does not cause the negative film 20 to entwine.

Meanwhile, in the present embodiment, the film accommodating case 82, elastic guide member 94 and bracket 88 are used as the guide means. However, the guide means is not limited to those used in the present embodiment. Any structure in which the leading end of the negative film 20 can be guided toward the periphery of the spool shaft 86 and be reliably trained around the spool shaft 86 may be used. For example, a guiding structure in which the leading end of the negative film 20 is guided around the spool shaft 86 in accordance with curling formed in the negative film 20 may also be applied.

Further, in the present embodiment, the structure in which the boss 110 provided in the flange portion 112 of the rotating shaft 104 and the boss 114 provided in the shaft main body 96 of the spool shaft 86 are coupled to each other by the coil spring 116 is used as the driving-force transmitting means. However, the structure of the driving-force transmitting means of the present invention is not limited thereto.

Next, a portion of the structure of the driving-force transmitting means which can be applied to the present invention will be described by referring to FIGS. 7 and 8. It should be noted that, in a following description, a basic structure thereof is the same as that of the present embodiment and the same components as those of the present embodiment will be denoted by the same reference numerals, and a description thereof will be omitted.

Figure 7:
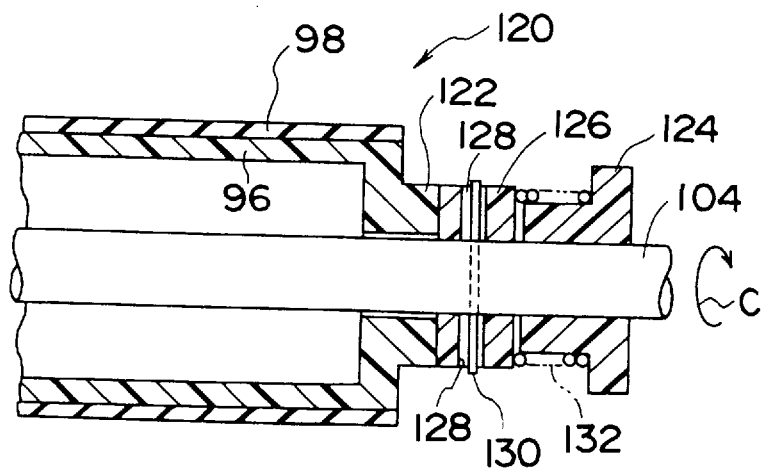
FIG. 7 is a cross sectional view of a main part of a spool shaft showing a modified example of driving-force transmitting means.

In a spool shaft 120 shown in FIG. 7, a boss 122 projects from the shaft main body 96 so as to be coaxial therewith. Further, a flange portion 124 is provided in the rotating shaft 104. Disposed between the flange portion 124 and the boss 122 of the spool shaft 120 is a block member 126 for generating a predetermined frictional force between the flange portion 124 and an end surface of the boss 122.

The block member 126 includes a through hole through which the rotating shaft 104 slidably passes at a central portion of the block member 126. An elongated hole 128 extends in a direction perpendicular to the above-described through hole, with a longitudinal portion thereof being disposed along an axial direction of the rotating shaft 104 when seen in plan view. A pin 130 passing through the rotating shaft 104 is inserted into the elongated hole 128. As a result, the block member 126 rotates integrally with the rotating shaft 104, and at the same time, can move along the axial direction of the rotating shaft 104.

Further, a compression coil spring 132 is interposed between the block member 126 and the flange portion 124 so as to urge the block member 126 toward the boss 122 of the spool shaft 120. As a result, a predetermined frictional force is generated between the boss 122 and the block member 126.

Thus, rotating force of the rotating shaft 104 is transmitted to the spool shaft 120 having the above-described structure by the frictional force generated between the boss 122 and the block member 126 so as to rotate the spool shaft 120. However, when a predetermined tension or more acts on the negative film 20 wound around the spool shaft 120, the spool shaft 120 rotates relatively with respect to the rotating shaft 104 against the frictional force between the boss 122 and the block member 126. Further, when tension of the negative film 20 decreases, the frictional force causes the spool shaft 120 to follow and rotate with the rotating shaft 104. As a result, the negative film 20 can be uniformly wound around the spool shaft 120 without any slack being formed in the negative film 20.

Figure 8:
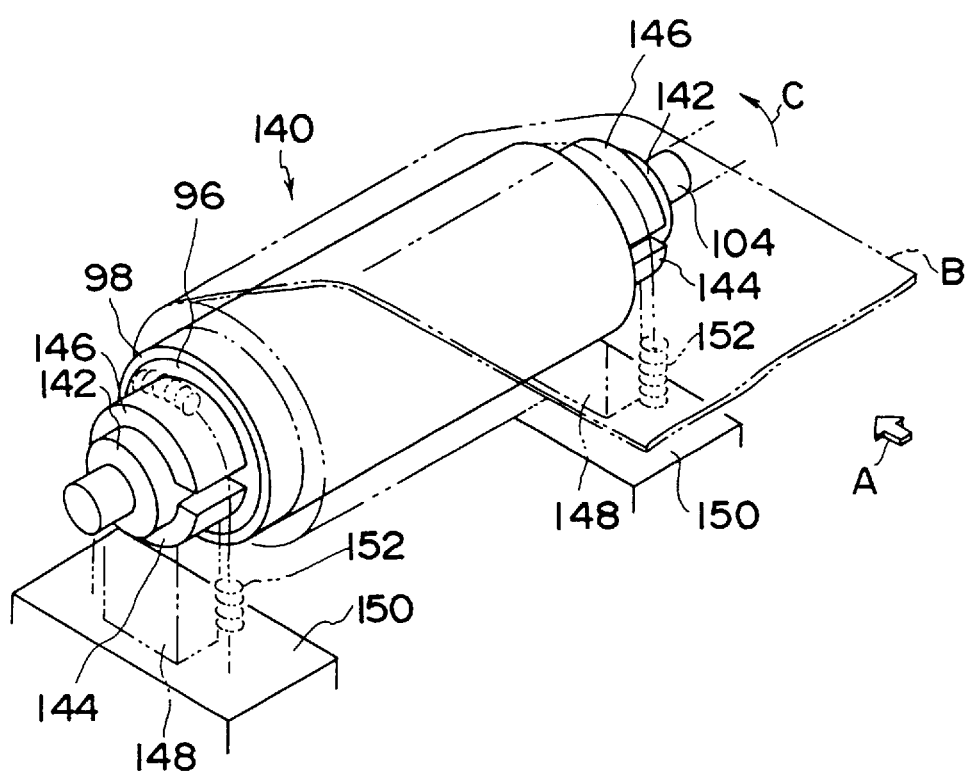
FIG. 8 is a schematic perspective view of a spool shaft showing a modified example of driving means.

Further, in a spool shaft 140 shown in FIG. 8, bosses 142 respectively project from both ends of the shaft main body 96 in the axial direction thereof. The rotating shaft 104 passes through these bosses 142 and the periphery of the rotating shaft 104 and respective inner surfaces of the bosses 142 move in a sliding manner. Thus, the spool shaft 140 and the rotating shaft 104 can rotate relatively with each other. Further, separated bearings 144, 146 are provided in a pair in each of the bosses 142. A block 148 is interposed between one bearing 144 and a base 150 of an unillustrated housing, and an intermediate portion of a coil spring 152 whose both ends are respectively connected to the base 150 to form urging means is trained around another bearing 146. For this reason, the pair of bearings 144, 146 rotatably supports the boss 142 of the spool shaft 140. At the same time, the pair of bearings 144, 146 urge the inner surface of the boss 142 toward the periphery of the rotating shaft 104 by the urging force of the coil spring 152, with the result that a predetermined frictional force is generated between the inner surface of the boss 142 and the periphery of the rotating shaft 104.

The spool shaft 140 rotates integrally with the rotating shaft 104 by the frictional force generated by the urging force of the coil spring 152. However, when the predetermined tension or more acts on the negative film 20 being wound around the spool shaft 140, the spool shaft 140 rotates relatively with respect to the rotating shaft 104 against the frictional force. As a result, the negative film 20 is wound around the spool shaft 140 with no slack formed therein. In this case as well, since unnecessary large tension is not applied to the negative film 20 on the base 28, it is possible to prevent deterioration of conveying accuracy of the negative film 20 on the base 28, deviation of the position where the image frame on the negative film 20 stops, and the like.

In the spool shafts 120, 140 respectively shown in FIGS. 7 and 8, when the urging means such as the coil springs 132, 152 is used, the frictional force can easily be changed by adjusting the urging force of the urging means.

In the present embodiment, the coil springs 116, 152, and the compression coil spring 132 are respectively used as the urging means. However, the urging means is not limited thereto. It is also possible to use other spring members such as a plate spring, and further use of other members such as rubber, having a predetermined elasticity. By using the above-described members, the driving-force transmitting means is formed with a simple structure.

Next, a description will be given of a second embodiment of the present invention. The second embodiment is different from the first embodiment only in the structure of the film accommodating portion. The structure that is different from the first embodiment is described below.

Figure 9:
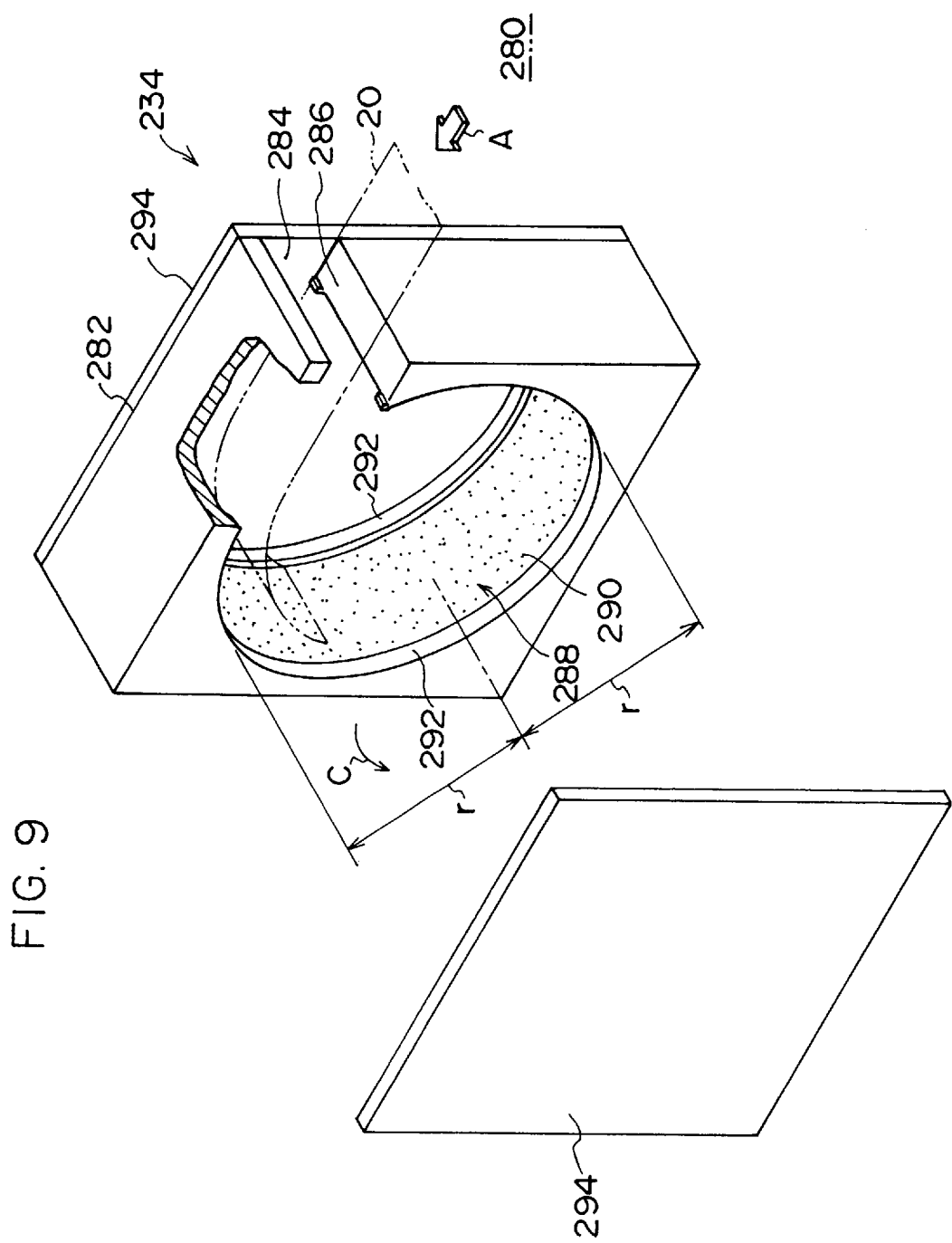
FIG. 9 is a perspective view of a main part of a film accommodating portion of a second embodiment, which shows a schematic structure thereof.

As shown in FIG. 9, a film accommodating block 282 serving as guiding and holding means is provided within a housing 280. The film accommodating block 282 is constructed in that a through hole 288 is formed at a central portion of a rectangle-shaped member and an axial direction of the through hole 288 is disposed along the transverse direction of the negative film 20 (i.e., the direction perpendicular to that in which the negative film 20 is transported).

A notch 286 is formed in the film accommodating block 282 on an upper side of the paper of FIG. 9 when seen from the axial direction of the through hole 288 in the vicinity of a corner portion adjacent to an opening 284. The notch 286 extends the through hole 288. The leading end portion of the negative film 20 transported and retracted from the opening 284 into the housing 280 passes through the notch 286 and is guided along an inner periphery 290 of the through hole 288 of the film accommodating block 282.

The inner periphery 290 of the film accommodating block 282 is subjected to a mat finish, process and further, Teflon coating. Further, guide rings 292 are provided in the through hole 288 of the film accommodating block 282 at both end portions of the through hole 288 in the axial direction thereof. The guide rings 292 are each formed into a circular arc having a predetermined radius r. The inner periphery of each of the guide rings 292 is also subjected to a mat finish process and Teflon coating and smooth and fine rugged portions are formed thereon. As a result, contact resistance becomes extremely low. Further, the guide rings 292 extend toward the opening 284 along the notch 286.

The guide rings 292 respectively correspond to both transverse-directional end portions of the negative film 20 transported to and received in the film accommodating block 282, and the negative film 20 is guided along the inner peripheries of the guide rings 292. At this time, since the inner peripheries of the guide rings 292 are each smooth, there is no possibility that conveying resistance of the negative film 20 increases due to contact resistance. Further, since the guide rings 292 respectively contact the both transverse-directional end portions of the negative film 20, an image frame at a central portion of the negative film 20 in the transverse direction thereof does not rub against the inner periphery 290 of the through hole 288. Further, even if the image frame rubs against the inner periphery 290, the surface of the negative film 20 is not damaged because the inner periphery 290 is finished smoothly.

Meanwhile, in the film accommodating block 282, side plates 294 are provided to block up both end portions of the through hole 288 in the axial direction thereof. The side plates 294 restricts the movement (a zigzag state) of the negative film 20 inserted into the through hole 288 along the transverse direction of the negative film 20.

Figure 10A:
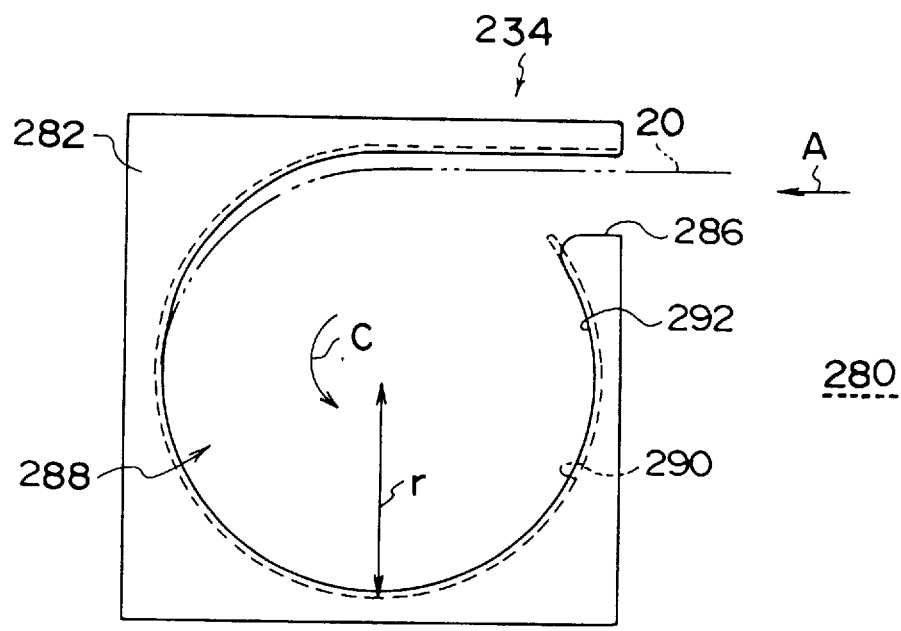
FIG. 10A is a schematic cross-sectional view of an inside of the film accommodating portion, which shows a state in which a leading end portion of a negative film is conveyed to and retracted into the film accommodating portion.

As shown in FIG. 10A, the leading end portion of the negative film 20 transported to and received in the through hole 288 of the film accommodating block 282 is guided along the inner surfaces of the guide rings 292 in the form of a loop in the direction of arrow C and reaches near the notch 286. At this time, the negative film 20 is guided in the form of a loop in a state in which an emulsion surface thereof, directed toward the winding shaft 56 when the negative film 20 is received in the cartridge 54, faces an axial center of the through hole 288. Namely, the leading end portion of the negative film 20 is guided in accordance with curling caused by the negative film 20 being retracted and accommodated in the cartridge 54.

Figure 10B:
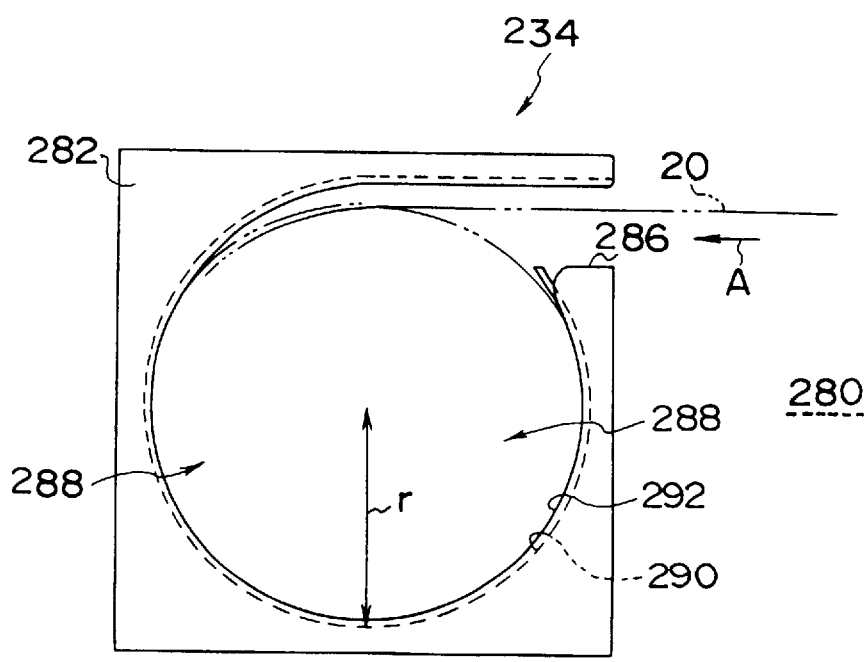
FIG. 10B is a schematic cross-sectional view of an inside of the film accommodating portion, which shows a state in which a leading end portion of a negative film is retracted into the film accommodating portion.

As shown in FIG. 10B, when the negative film 20 is further retracted from the base 28 into the film accommodating portion 234, the leading end portion of the negative film 20 moves along the surface of an intermediate portion of the negative film 20 newly retracted from the notch 286 into the film accommodating block 282. In this way, the negative film 20 is retracted in a layered state within the film accommodating block 282, and accommodated and held in the film accommodating block 282 of the film accommodating portion 234.

Next, an operation of the second embodiment will be described.

The process of the second embodiment is the same as the first embodiment, in which the cartridge 54 where the negative film 20 is accommodated in a state of being wound around the winding shaft 56 is loaded in the cartridge loading portion 32 of the negative carrier 10, the negative film 20 is pulled out of the cartridge 54 while being transported at a fixed velocity and stopped, repeatedly, so that the image is printed onto the printing paper every image frame, and the negative film 20 reaches the film accommodating portion 234. Therefore, the description thereof will be omitted.

The negative film 20 pulled out of the cartridge 54 while being transported at a fixed velocity and stopped, repeatedly, is received in the opening 284 of the film accommodating portion 234 and into the through hole 288 of the film accommodating block 282 disposed within the housing 280.

As shown in FIG. 10A, both leading end portions of the transverse-directional both sides of the negative film 20 pass through the notch 286 from the opening 284 and reach the inner peripheries of the guide rings 292 provided within the through hole 288. In addition, when the negative film 20 is transported with the conveying motor 48 of the base 28 being operated and stopped, the leading end portion of the negative film 20 moves along the inner periphery 290 of the through hole 288.

At this time, the negative film 20 is guided within the through hole 288 in accordance with curling of the negative film 20 with an emulsion surface thereof facing the side of an axial center of the through hole 288. Further, since the negative film 20 is guided in such a manner that both end portions thereof in the transverse direction contact the guide rings 292 and an image frame portion is separated from the inner periphery 290, the image frame portion cannot rub on the inner periphery 290 and be damaged. Further, the inner peripheries of the guide rings 292 which contact the negative film 20 are subjected to a mat finish process and the contact area with respect to the negative film 20 is small. At the same time, the inner peripheries of the guide rings 292 are also subjected to Teflon coating and formed smoothly. As a result, the frictional force generated between the negative film 20 and the inner peripheries of the guide rings 292 is minimal when these surfaces contact the surface of the negative film 20. For this reason, the negative film 20 is smoothly guided within the through hole 288 along the guide rings 292.

In this way, when the negative film 20 whose leading end portion reaches near the notch 286 of the film accommodating block 282 is retracted from the base 28 into the film accommodating block 282, as shown in FIG. 10B, the negative film 20 is successively wound up in such a manner that the leading end portion thereof is guided within the through hole 288 along the surface of a newly received portion of the negative film 20, the newly received portion passing through the notch 286 and into the through hole 288 of the film accommodating block 282.

At this time, since the side plates 294 restrict the movement of the negative film 20 in the transverse direction thereof, the negative film 20 transported into the film accommodating block 282 is accommodated within the through hole 288 in a state of being uniformly wound up in layers. Further, the film accommodating portion 234 does not pull on the negative film 20 transported from the base 28. Accordingly, it is possible to eliminate unnecessary large tension applied to the negative film 20 causes the negative film 20 on the base 28 to be pulled, so that the position of the image frame on the negative film 20 to be located at a predetermined position is not deviated therefrom, and conveying accuracy of the negative film 20 transported at a fixed velocity does not deteriorate.

Moreover, if a winding shaft or the like is rotated within the film accommodating portion 234 and the negative film 20 is wound around the winding shaft, with the result that the peripheral velocity of the negative film 20 wound around the winding shaft is not adjusted to the conveying speed of the negative film 20 transported on the base 28, a slack portion and a tight portion are alternately formed in the negative film 20 wound around the winding shaft. As a result, there is a drawback in that the surfaces of the negative film 20 rub against each other and are damaged. On the contrary, in the present embodiment, the negative film 20 is wound up by conveying force which is applied to the negative film 20 on the base 28. As a result, the surfaces of the negative film 20 wound up in a layered state do not considerably rub against each other.

On the other hand, when the negative film 20 stops on the base 28, the negative film 20 is prevented from moving not only in the direction in which the negative film 20 is transported to the film accommodating portion 234, but also in the direction in which it is pulled out thereof. In addition, the negative film 20 presses the guide surface 290 outwardly in a radial direction within the through hole 288 by its own elasticity. As a result, the negative film 20 is accommodated and held in a state of being received in the film accommodating block 282.

When the negative film 20 accommodated within the film accommodating portion 234 in the above-described manner is retracted again onto the winding shaft 56 and is accommodated in the cartridge 54, the conveying motor 48 of the base 28 and the motor 60 of the cartridge loading portion 32 is driven to reverse, and the negative film 20 is transported in the direction opposite to arrow A. At the same time, the winding shaft 56 is driven to rotate in the direction in which the negative film 20 is wound around the winding shaft 56 (i.e., the direction opposite to arrow B). As a result, the negative film 20 retracted and accommodated in the film accommodating block 282 is pulled back to the cartridge 54 in such a manner that an outermost layer on the side of the outer periphery of the roll of the negative film 20 is first pulled out of the film accommodating block 282 and the negative film 20 is moved to slide along the guide rings 292 of the through hole 288 in the direction opposite to that in which it is received in the film accommodating block 282 (i.e., the direction opposite to arrow C). At this time as well, the negative film 20 is smoothly guided by the guide rings 292 within the through hole 288.

As described above, in the negative carrier 10 of the second embodiment, when an exposure operation is effected while the negative film 20 is being pulled out of the cartridge 54, the negative film 20 pulled out of the cartridge 54 is accommodated in the film accommodating block 282 provided in the film accommodating portion 234 in a state of being uniformly wound up by a conveying force which is applied to the negative film 20 on the base 28. As a result, the negative film 20 pulled out of the cartridge 54 does not entwine due to its own curling. Further, since the negative film 20 is accommodated in the film accommodating block 282 in a state of being smoothly wound up due to its own curling, unnecessary tension is not applied to the negative film 20.

Further, since the negative film 20 is received in the film accommodating portion 234 by a conveying force which is applied to the negative film 20 on the conveying path 42 of the base 28, the film accommodating portion 234 does not require a particular driving force for winding and accommodating the negative film 20, which results in a simple structure.

Meanwhile, the negative carrier 10 of the present embodiment is one example of the film carrier of the present invention, but the present invention is not limited thereto. In the present invention, as the guiding and holding means, the film accommodating block 282 is used, having the guide rings 292 disposed along the inner periphery of the through hole 288. However, the guiding and holding means is not limited thereto and various structures are applicable.

The present embodiment is constructed in that, in order to reduce the frictional force between the guide rings 292 and the negative film 20, the guide rings 292 are each subjected to a mat finish process and Teflon coating. However, other methods and/or means may also be used, as long as the negative film 20 can smoothly be guided with the frictional force reduced therebetween.

Figure 11B:
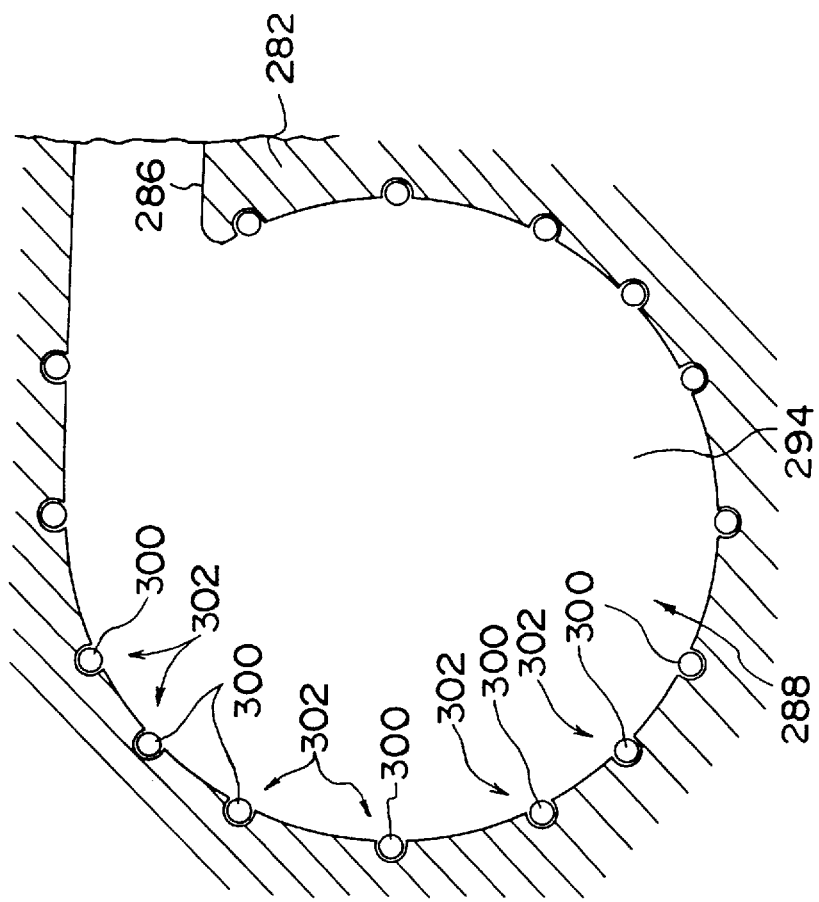
FIG. 11B is a cross-sectional view of a main part of a guiding and holding means formed by the roller shown in FIG. 11A.
Figure 11A:
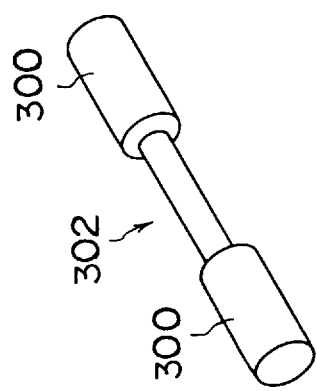
FIG. 11A is a perspective view showing a roller forming a part of guiding and holding means which can be applied to the present invention.

For example, as shown in FIG. 11A, a roller 302 having small rollers 300 at both end portions in an axial direction thereof may be used as the guiding and holding means. When, as shown in FIG. 11B, the rollers 302 are used, the rollers 302 are each rotatably disposed on the inner periphery 290 of the film accommodating block 282, with a portion of an outer peripheral portion of the small roller 300 projecting from the inner periphery 290. At this time, these small rollers 300 are disposed at predetermined intervals along the inner periphery 290, with the small rollers 300 of each roller 302 respectively facing transverse-directional both end portions of the negative film 20 in the transverse direction thereof.

Figure 12:
FIG. 12 is an example of a ball which can be used in the second embodiment.

As a result, the negative film 20 transported to and received in the through hole 288 of the film accommodating block 282 is smoothly guided along the inner periphery 290 of the through hole 288 while contacting the small rollers 300 of each roller 302 and is retracted and accommodated in the film accommodating block 282. Meanwhile, as shown in FIG. 12, the roller 302 may be replaced by a ball 400 or the like. A large number of balls 400 are each rotatably disposed on the inner periphery 290 in such a manner that a portion of an outer peripheral portion of each of the balls 400 projects from the inner periphery 290, and the negative film 20 may be smoothly guided by the large number of balls. It is preferable that the large number of balls 400 be disposed so as to contact both end portions of the negative film 20 in the transverse direction thereof.

Figure 13:
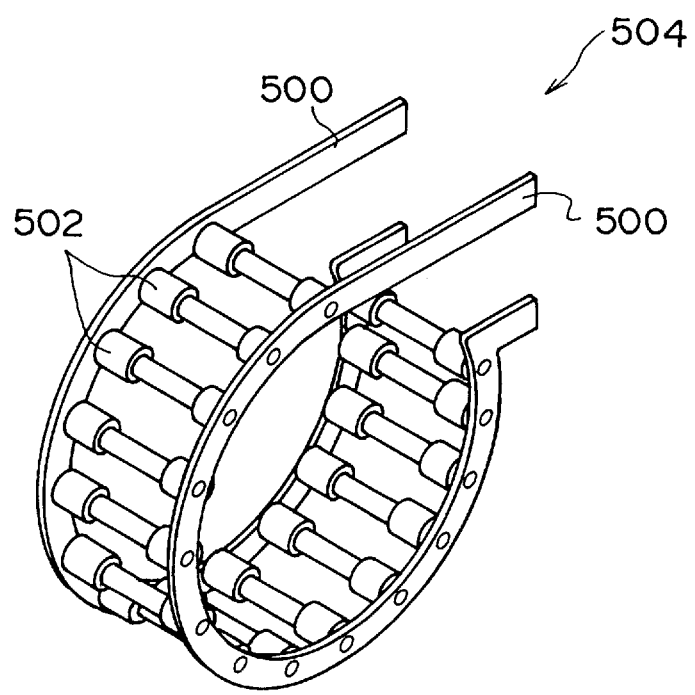
FIG. 13 is an example of a film accommodating portion in which a loop-shaped frame which can be used in the second embodiment rotatably holds a roller.

Further, when the roller 302 or the like is used, as shown in FIG. 13, the film accommodating block 282 may be replaced by a film accommodating portion 504 in which a loop-shaped frame 500 rotatably holds rollers 502. In this case as well, the negative film 20 is guided and wound by the plurality of rollers 502 in the form of a loop and the wound negative film 20 is prevented from moving in the transverse direction thereof by the rollers 502 and is held thereby.

Further, the film accommodating portion of the present invention is provided in the film carrier and is constructed in that a photographic film pulled out of a cartridge is retracted and accommodated. A base portion and a cartridge loading portion which form a film carrier is not limited thereby.

What is claimed is:

1. A film carrier, in which a cartridge, where a photographic film is wound around a winding shaft in a layered state and is accommodated, is loaded in a cartridge loading portion, the photographic film being transported on a base portion by transporting means while being pulled out of the cartridge, and image frames recorded on the photographic film are successively disposed at a predetermined printing position, and the photographic film is received and accommodated in a film accommodating portion provided on a side opposite to the cartridge loading portion with the base portion disposed between the film accommodating portion and the cartridge loading portion, said film carrier comprising:

a spool shaft provided in said film accommodating portion, for winding said photographic film;

guiding means provided in said film accommodating portion, for guiding said photographic film transported by said transporting means toward a periphery of said spool shaft and for winding said photographic film around said spool shaft;

driving means which can drive said spool shaft to rotate; and driving-force transmitting means provided between said driving means and said spool shaft, for transmitting a driving force of said driving means, to said spool shaft such that a winding speed of said spool shaft is adjusted to a conveying speed of said transporting means;

wherein said driving-force transmitting means is rotated by said driving means, and further comprises:

a rotating shaft which is rotatable relatively with respect to said spool shaft; and urging means for transmitting a rotating force between said spool shaft and said rotating shaft by a predetermined frictional force generated between said rotating shaft and said spool shaft;

wherein said urging means is provided in that, when at least a predetermined rotating force is applied to said spool shaft in a direction opposite to a direction in which said photographic film is wound around said spool shaft, said spool shaft can rotate relatively with respect to said rotating shaft in the direction opposite to the direction in which said photographic film is wound around said spool shaft; and wherein said rotating shaft passes through an axial center of said spool shaft and said urging means is spring means which rotates together with said rotating shaft in a direction opposite to the direction in which said photographic film is wound around said spool shaft, said urging means which urges and presses a block member provided on said rotating shaft in a state in which said block member can move in an axial direction of said rotating shaft.

\* \* \* \* \*